United States Patent [19]

Sato et al.

[11] Patent Number: 5,093,752
[45] Date of Patent: Mar. 3, 1992

[54] DEVICE FOR MOVING CAPSTAN INTO POSITION AFTER TAPE IS LOADED

[75] Inventors: Tsuguo Sato; Hirobumi Nagumo; Takashi Shimodaira; Etsuro Saito, all of Kanagawa, Japan

[73] Assignee: Sony Corporation, Tokyo, Japan

[21] Appl. No.: 478,822

[22] Filed: Feb. 12, 1990

[30] Foreign Application Priority Data

| Feb. 20, 1989 | [JP] | Japan | 1-040024 |
| Sep. 8, 1989 | [JP] | Japan | 1-233602 |
| Sep. 8, 1989 | [JP] | Japan | 1-233603 |

[51] Int. Cl.$^5$ .................................. G11B 5/027
[52] U.S. Cl. ........................................... 360/85
[58] Field of Search ................................ 360/85, 95

[56] References Cited

U.S. PATENT DOCUMENTS

| 3,674,942 | 7/1972 | Sugaya | 360/85 |
| 4,166,283 | 8/1979 | Van Slageren . | |
| 4,642,706 | 2/1987 | Vollmann et al. . | |
| 4,652,946 | 3/1987 | Ryan . | |
| 4,656,540 | 4/1987 | Kodama et al. . | |

FOREIGN PATENT DOCUMENTS

WO88/09550 12/1988 PCT Int'l Appl. .

*Primary Examiner*—A. J. Heinz
*Attorney, Agent, or Firm*—Lewis H. Eslinger; Jay H. Maioli

[57] ABSTRACT

In a tape loading device in which a tape is drawn from a mounted tape cassette and loaded on a tape path which lies in front of the mounted tape cassette, a big capstan which is arranged in front of the mounted tape cassette is inserted into a space formed between the mounted tape cassette and a portion of the tape which has been loaded on the tape path, from a position where the big capstan does not interfere with the tape which is moved to the tape path, so that it is possible to make the diameter and length of the capstan large.

7 Claims, 17 Drawing Sheets

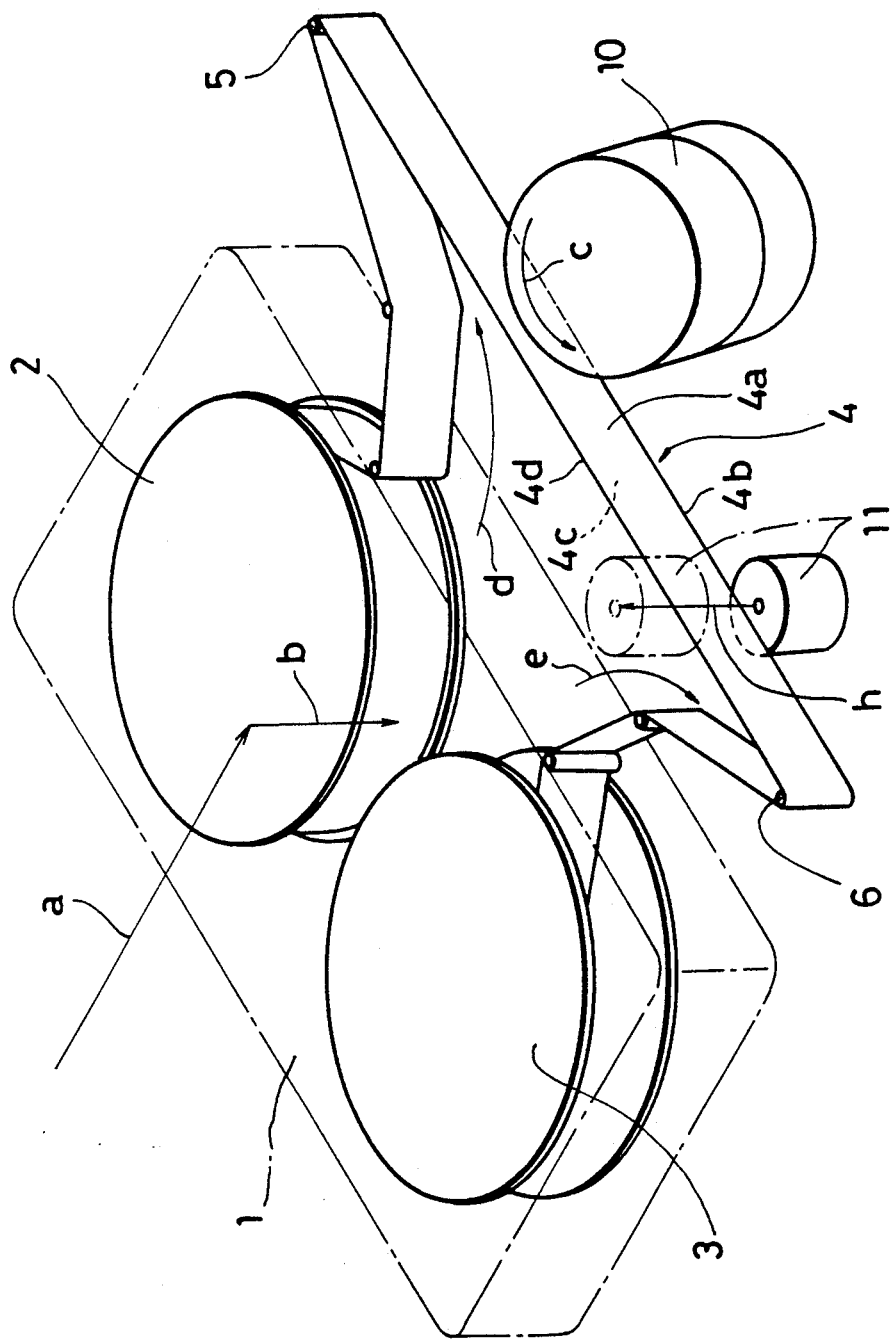

DEVICE FOR MOVING CAPSTAN INTO POSITION AFTER TAPE IS LOADED

BACKGROUND OF THE INVENTION

1. Field of the Invention

This invention relates to a tape loading device, and is best applicable to a cassette tape recording and/or reproducing apparatus for a digital VTR, for example.

2. Description of the Prior Art

For instance, in the disclosure of U.S. Pat. No. 4,652,946, a big capstan incorporated in a tape loading device for a digital VTR is brought into contact with the back surface (not the front surface which is coated with magnetic powder) of a magnetic tape so as to protect the coated front surface.

In such tape loading device, the big captan is arranged below a compartment wherein a tape cassette is horizontally withdrawn into the VTR and horizontally mounted, from above, on a pair of reel hases. Further, the capstan is inserted, from below and together with a plurality of tape loading means, into a space formed between the tape cassette and a portion of the tape which has been stretched within an opening that is provided on a front side of the tape cassette.

While the tape is drawn from the tape cassette by the plurality of tape loading means after the tape cassette is mounted, the tape is wrapped around the capstan at a predetermined contact angle by a pair of tape guides which are moved in a reverse direction for the tape being drawn by the tape loading means, and when the record mode, the playback mode or the like is established, the tape is driven by friction caused between the capstan and the back surface of the tape.

However, in such tape loading device, the tape loading means and the tape guides are moved in the opposite direction of each other, so that the tape is excessively stretched between the tape loading means and the tape guides, and often receives damages.

If the back tension of the tape is reduced to prevent the tape from such damage, the tape is apt to slip out of the tape loading means, so that it becomes difficult to load the tape at high speed.

Moreover, there is naturally a limit to the area and height of the opening of the tape cassette, into which the captan, the plurality of tape loading means, and also the pair of tape guides are inserted at a time of tape loading, so that it is difficult to make the diameter and the length of the capstan large. The small diameter of the capstan prevents the tape from running at high speed so as to shorten access time, and the small length of the capstan prevents the tape from running stably. Further, the compartment above the capstan interferes with the maintenance of the capstan.

In the meantime, in the conventional tape loading device for VTRs, a tape-tension adjusting device 231 shown in FIG. 11 is widely used, for example, as disclosed in Japanese Laid Open Utility Model Registration No. 56-152958. In FIG. 11, a supply reel base 220 is rotatably supported by a chassis of the VTR (not shown), and around the supply reel base 220, a band brake 221 is wrapped. An arm 225 is rotatable on a shaft 223 which projects from the chassis, and has a tape guide 224 at the distal end thereof and a projection at the proximal end thereof. One end of the band brake 221 is fixed to the chassis, and the other end is connected, through a pin 226, to the free end of the projection of the arm 225. A magnetic tape T unwound from a reel that is mounted on the reel base 220 is wrapped around the tapeguide 224 and fed to a rotary head drum (not shown).

To give back tension to the tape T, a tension spring 228 is stretched between an intermediate position 225a of the arm length and an spring stop 227a which is provided in a worm wheel 227 that is rotatably supported by the chassis and meshed with a worm 230. The torque of a motor 229 is imparted to the worm 230 through a belt 229b. Thus, the tape-tension adjusting device 231 comprises the band brake 221, the arm 225 and the tension spring 228, and the tape tension is detected through the tape guide 224 of the arm 225.

If the tape tension is too large, the motor 229a is driven to rotate the worm wheel 227 counterclockwise in FIG. 11, so that the tension of the spring 228 is reduced so as to rotate the arm 225 counterclockwise. As a result, the braking force of the band brake 221, which acts on the supply reel base 220, is reduced. On the contrary, if the tape tension is too small, the worm wheel 227 is rotated clockwise in FIG. 11, so that the tension of the spring 228 is increased so as to rotate the arm 225 clockwise. As a result, the braking force is increased. That is, the back tension of the tape T is adjusted due to rotation of the worm wheel 227, so that the tape T can be made to stably run.

However, the tape-tension adjusting device 231 described above has no means to detect the angle of rotation of the arm 225 in order to adjust the tension of the spring 228, so that as shown in FIG. 12, the tension of the tape T remarkably increases for a transition period, for example, while the stop mode is changed over to the play back mode. Thus, the tape T is often damaged.

OBJECTS AND SUMMARY OF THE INVENTION

Accordingly, it is an object of the present invention to provide a tape loading device in which a tape which is accommodated in a mounted tape cassette, is drawn from the tape cassette and loaded on a tape path by tape loading means at a time of tape loading, and thereafter, a big capstan, which is located in a stand-by position where the capstan does not interfere with the movement of the tape, is inserted into a space formed between the mounted tape cassette and a portion of the tape which has been loaded on the tape path, and then, located in a tape drive position thereof, in which the capstan abuts against the tape from the same direction as the tape is drawn, so that the tape is prevented from suffering damages due to excessive tension given thereto, and can be securely loaded at high speed. In addition, as the above space is sufficiently large, the diameter and the length of the capstan can be made sufficiently large. The large diameter makes it possible to shorten the access time, and the large length makes it possible to stably run the tape. It is to be noted that the capstan is arranged not below but in front of the tape cassette, so that it facilitates the maintenance of the capstan.

Another object of the invention is to provide a tape loading device in which the tension of a tape is kept constant during tape loading in order to prevent the tape from suffering damages due to excessive tension, or from slipping out of tape loading means due to lack of tension, so that it becomes possible to helically wrap the tape around a rotary head drum securely with high accuracy, and to load the tape at high speed.

A further object of the invention is to provide a tape loading device in which the pause mode can be established without reducing tape tension, so that if a run of the tape is temporarily stopped, the tape again comes in contact with a rotary head drum in the same position as before, and thus, it becomes possible to edit the tape with high accuracy.

Still a further object of the invention is to provide a tape loading device in which a big capstan is inserted into a gap formed between a pair of tape guides of the tape loading device to wrap a tape around the capstan at a large contact angle, so that the tape is securely driven by friction caused between the capstan and the tape.

Still another object of the invention is to provide a tape loading device in which a big capstan is moved along and thereafter, revolved around a cylindrical cam of a capstan transport mechanism or vice versa, by a motor carriage which has a cam follower guided by the cylindrical cam. Thus, the capstan is transported between a stand-by position and a tape drive position thereof only by the single cylindrical cam, and as a result, the number of the parts of and the steps required for the assembly of the capstan transport mechanism are reduced. In addition, it becomes possible to make the construction of the capstan transport mechanism very simple, to make a space requisite for the capstan transport mechanism very small in order to miniaturize the tape loading device, and to position the capstan with accuracy only due to adjustment of the capstan transport mechanism at a time of assembling the tape loading device so that it may become easy to set the capstan upright.

Still another object of the invention is to provide a tape loading device in which a motor carriage is suspended from a bearing block through a tension spring so as to be positioned at a predetermined height, so that a big capstan is smoothly movable along the axis of a cylindrical cam.

Still another object of the invention is to provide a tape loading device in which a tape is prevented from being abnormally stretched for a transition period which occurs at a mode changing time.

In accordance with the aspect of this invention, in a tape loading device comprising a tape path which faces a rotary head drum arranged in front of a mounted tape cassette, and tape loading means whereby a tape is drawn from the tape cassette and wrapped around the rotary head drum at a predetermined contact angle to load the tape on the tape path, the tape loading device further comprises a big capstan which is arranged in front of the mounted tape cassette, and a capstan transport mechanism for moving the big capstan from a stand-by position where the big capstan does not interfere with the movement of the tape which is drawn from the tape cassette and then loaded on the tape path, to a tape drive position where the big capstan is inserted into a space formed between the tape cassette and a portion of the tape which has been loaded on the tape path so as to drive the tape by friction caused between the tape and the capstan.

As a second alternative of the invention, the tape loading device further comprises a big capstan arranged in front of the mounted tape cassette, and a capstan transport mechanism for moving the big capstan from a stand-by position where the big capstan does not interfere with the movement of the tape which is drawn from the tape cassette and loaded on the tape path, to a tape drive position where the big capstan is inserted into a space formed between the tape cassette and a portion of the tape which has been loaded on the tape path so as to drive the tape by friction caused between the tape and the capstan, wherein the capstan transport mechanism comprises a cylindrical cam which is driven by drive means and has a helically extending cam groove, and a motor carriage which has a cam follower guided by the cam groove, and on which a capstan drive motor for driving the capstan is mounted, and as the cylindrical cam is rotated, the motor carriage is vertically moved along the axis of the cylindrical cam, and thereafter, horizontally revolved around the axis of the cylindrical cam, or vice versa.

As a third alternative of the invention, the tape loading device further comprises a tape-tension adjusting device which comprises a reel drive motor capable of regulating the back tension of the loaded tape, an arm for detecting tape tension, a spring for urging the arm against the tension of the tape, a stepping motor for controlling the force of the spring, a sensor for detecting the angle of rotation of the arm, a servo circuit for regulating the back tension of the tape based on a signal from the sensor due to rotation of the reel drive motor and controlling the force of the spring due to rotation of the stepping motor, whereby to prevent the tape tension from abnormally increasing for a transition period between two operation modes in a tape recording and/or reproducing apparatus, the force of the spring is controlled so as to be instantaneously decreased.

The invention will now be described by way of example with reference to the accompanying drawings, throughout which like parts are referred to by like references.

BRIEF DESCRIPTION OF THE DRAWINGS

FIGS. 1A to 1C are schematic perspective views of a tape loading device according to an embodiment of this invention;

DETAILED DESCRIPTION OF PREFERRED EMBODIMENTS

Figure 1B:
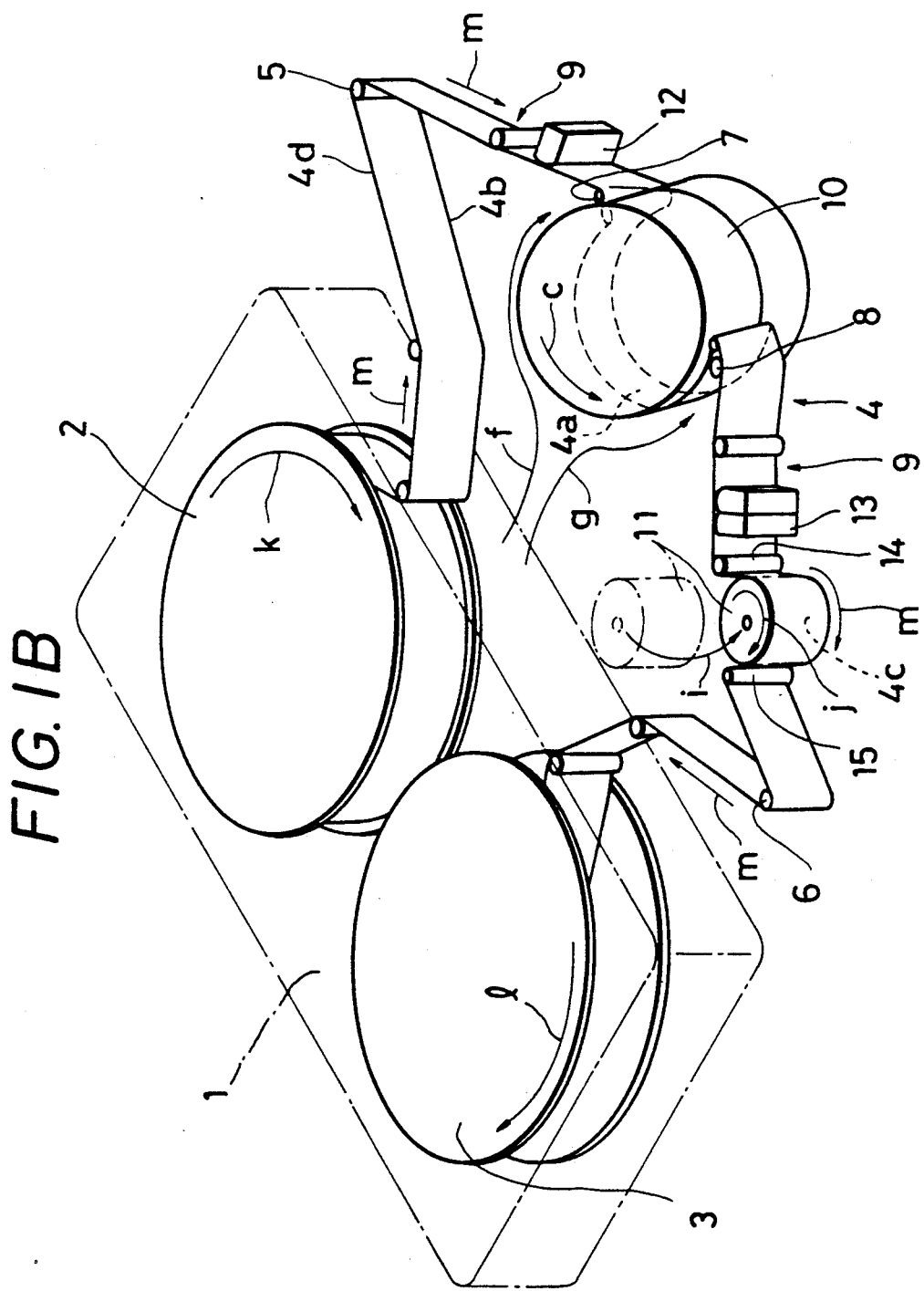

Referring to the drawings, a digital VTR embodying the present invention will be described.

Figure 1C:
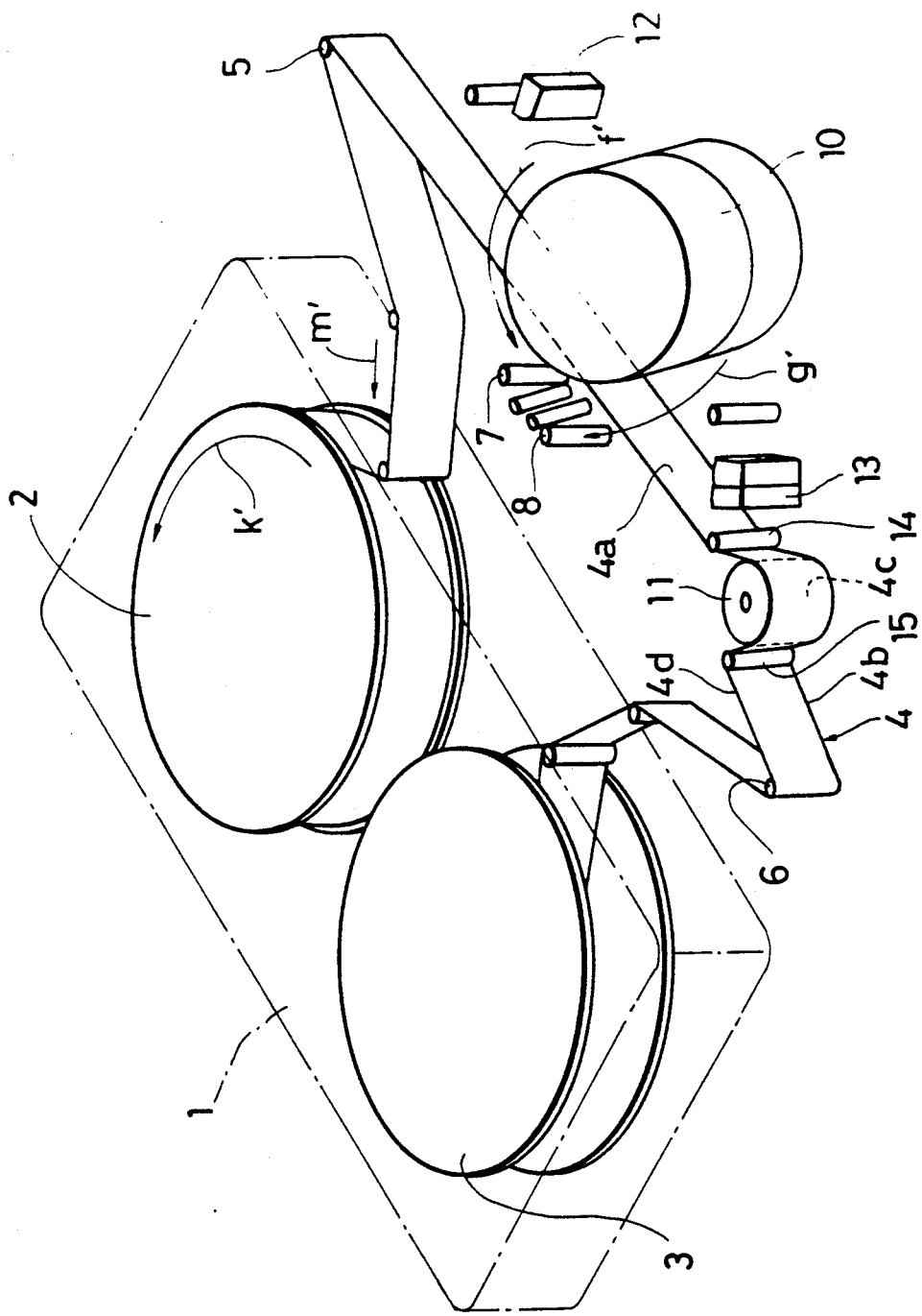

An Outline of a Tape Loading Device (FIGS. 1A to 1C)

As shown in FIG. 1A, a tape cassette 1 is horizontally drawn into the digital VTR in a direction of arrow a, and then, lowered in a direction of arrow b within a compartment not shown. Thus, a supply reel 2 and a take-up reel 3 of the tape cassette 1 are mounted, from above, on respective reel bases (hereinafter described), and simultaneously, a plurality of loading means 5 and 6 are inserted, from below, into a space which is formed between the tape cassette 1 and a magnetic tape 4 that is stretched between the reels 2 and 3 within an opening provided in a front side of the tape cassette 1.

To load the magnetic tape 4 on a tape path, a rotary head drum 10 is driven at high speed, for example, in a direction of arrow c in FIG. 1A, and then, the tape 4 is horizontally drawn from the tape cassette 1 by the pair of first tape loading means 5 and 6 which are swung in directions of arrows d and e, respectively.

In succession, the tape 4 is further drawn from the tape cassette 1 in directions of arrows f and g in FIG. 1B by a pair of right and left second tape loading means 7 and 8. The front surface 4a of the tap 4, which is coated with magnetic powder, is then wrapped at a predetermined contact angle around a rotary head drum 10 which is so located as to face a tape path 9, and also, brought into contact with a pair of stationary heads 12 and 13 which are so located as to face the tape path 9. It is to be noted that the tension of the tape is kept constant during the tape loading operation as hereinafter described.

A big capstan 11 is located in a position indicated in solid lines in FIG. 1A, which does not overlap with the tape cassette 1 and that is lower than the lower edge 46 of the tape 4 that is to be brought into the tape path 9 during the loading operation, so that the tape 4 can move horizontally over the capstan 11 without being obstructed by the capstan 11.

As shown in FIG. 1B, after the tape 4 is brought into the tape path 9, the capstan 11 is vertically raised in a direction of arrow h (FIG. 1A) from the position indicated in solid lines to a position indicated in chain-dotted lines, where the capstan 11 has the same height as the tape 4, within the space formed between the tape cassette 1 and a portion of the tape 4 which has been drawn from the tape cassette 1.

Successively, the capstan 11 is horizontally moved in a direction of arrow i from the position indicated in chain-dotted lines, to a tape drive position indicated in solid lines in FIG. 1B, which lies between a pair of tape guide 14 and 15, and where the back surface 4C of the tape 4, which is uncoated with magnetic powder, is wrapped around the capstan 11 at a predetermined contact angle.

When the record mode or the playback mode is established after the above loading is completed, the capstan 11 is rotated at high speed in a direction of arrow j in FIG. 1B, and the tape 4 is driven by friction caused between the tape 4 and the capstan 11, so that the tape 4 runs at constant speed in a direction of arrow m along the tape path 9, and is wound on the take-up reel 3. At that time, the reels 2 and 3 have been driven in respective directions of arrows k and 1 in FIG. 1B, and information is recorded on or reproduced from the tape 4 through the rotary head drum 10 which has been rotated at high speed in the direction of arrow c.

When the record mode or the playback mode is changed over to the pause mode, the capstan 11 is still retained in the tape drive position as shown in FIG. 1C, but the pair of second tape loading means 7 and 8 are moved to predetermined positions in directions of arrows f' and g', respectively, and at the same time, the supply reel 2 is rotated in a direction of arrow k', so that the tape 4 is wound on the supply reel 2 to decrease the contact angle of the rotary head drum 10 with the tape 4, and then, the supply reel 2 is stopped.

A Detail of the Tape Loading Device (FIGS. 2A to 2E)

The supply reel 2 and the take-up reel 3 which are included in the tape cassette 1 are horizontally mounted on respective reel bases 22 and 32 which are driven by motors 21 and 31, respectively.

The pair of first tape loading means 5 and 6 have functions of unwinding the tape 4 from the supply reel 2 and the take-up reel 3, respectively, and of detecting the tension of the tape 4. The first tape loading means 5 and 6 have arms 52 and 62 which are rotatable in the directions of arrows d, d' and e, e' on shafts 51 and 61, and pins 53 and 63 which are secured to the distal ends of the arms 52 and 62, respectively. The shafts 51 and 61 are driven by control motors 54 and 64 through gears 55, 56 and 65, 66, and angles of rotation of the arms 52 and 62 are detected by goniometry sensors 57 and 67, respectively. Thus, two back-tension control mechanisms comprise the respective arms 52 and 62, the respective control motors 54 and 64, the respective goniometry sensors 57 and 67, and the respective reel motors 21 and 31 on the tape supply and the tape take-up sides 41 and 42 of the rotary head drum 10.

The pair of second tape loading means 7 and 8 comprise sliders 71 and 81, and a plurality of tape guides 72 and 82 which are secured to the sliders 71 and 81, respectively. The sliders 71 and 81 are movable in the directions of arrows f, f' and g, g' on guideways 73 and 83, respectively. The guideways 73 and 83 extend along respective sides of the rotary head drum 10, and the back ends of the guideways 73 and 83 lie below the mounted tape cassette 1. In the forward ends of the guideways 73 and 83, there are arranged respective positioning means 74 and 84 for positioning the sliders 71 and 81.

The capstan 11 located in the position which does not overlap with the tape cassette 1, is movable along and around a vertically arranged cylindrical cam 111 by a capstan transport mechanism 110 hereinafter described. In the two stationary heads 12 and 13, the head 12 is a erase head, and the head 13 consists of an audio-record/playback head and a control head. The head 13 is suspended from a head base (not shown), which is arranged in a position higher than the upper edge 4d (FIG. 1A) of the tape 4, and the pair of tape guides 14 and 15 and the rotary head drum 10 are arranged on opposite sides of the head 13. It is to be noted that reference numerals 16a, 16b and 16c shown in FIG. 2B denote stationary tape guides which are arranged on the tape supply side 41, and reference numerals 17a, 17b and 17c denote stationary tape guides which are arranged on the tape take-up side 42.

Figure 2A:
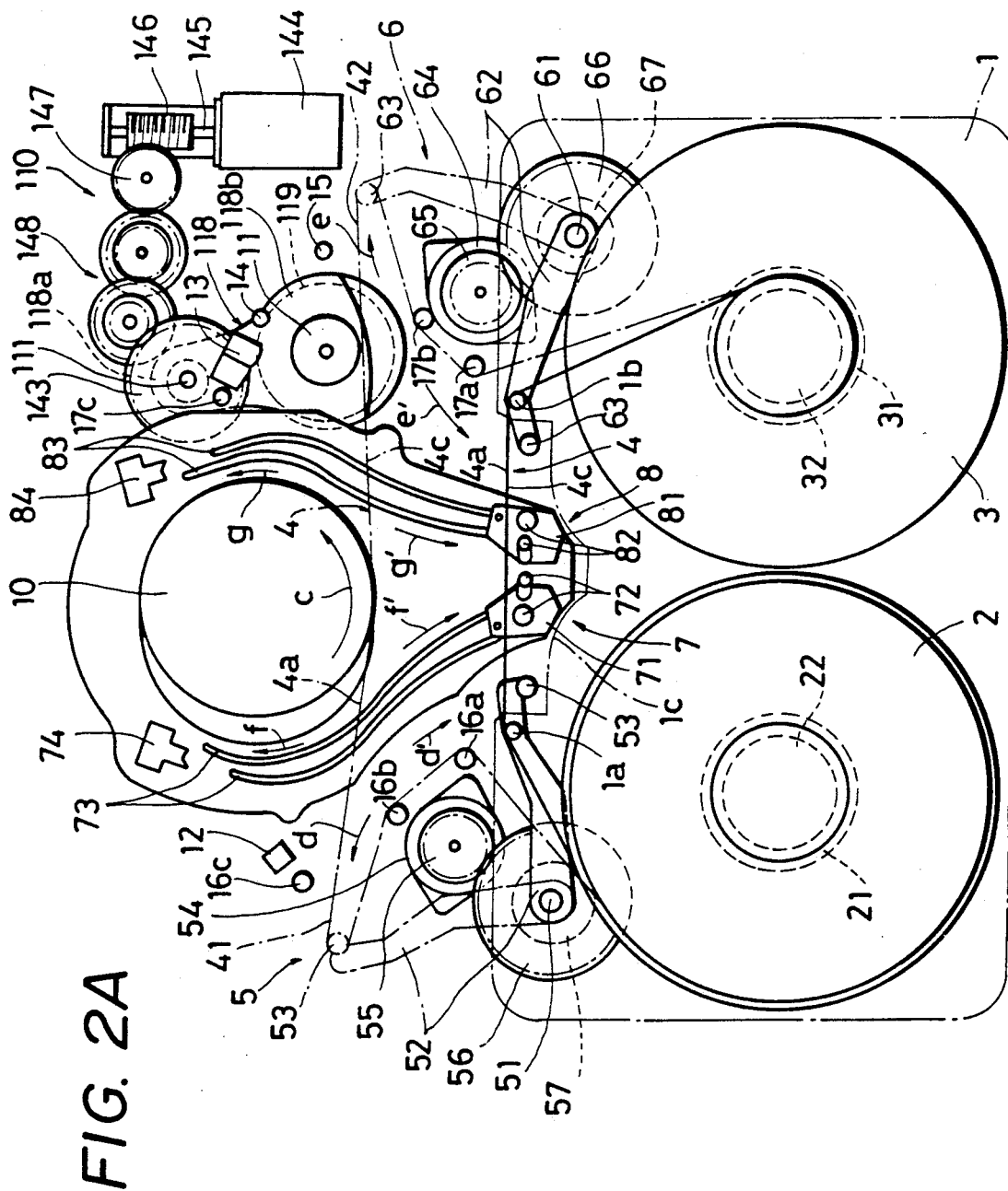
FIGS. 2A to 2E are plan views of the tape loading device of FIGS. 1A to 1C.

In FIG. 2A, the supply reel 2 and the take-up reel 3 which are included in the tape cassette 1 are horizontally mounted on the supply reel base 22 and the take-up reel base, respectively, and the magnetic tape 4 is stretched, as indicated in solid lines in FIG. 2A, between the pair of tape guides 1a and 1b along the opening 1c which is provided on the front side of the tape cassette 1. The pins 53 and 63 and the tape guides 72 and 82 are positioned in a space formed in the opening 1c, and surrounded by the tape cassette 1 and a portion of the tape which has been stretched between the tape guides 1a and 1b.

Figure 2B:
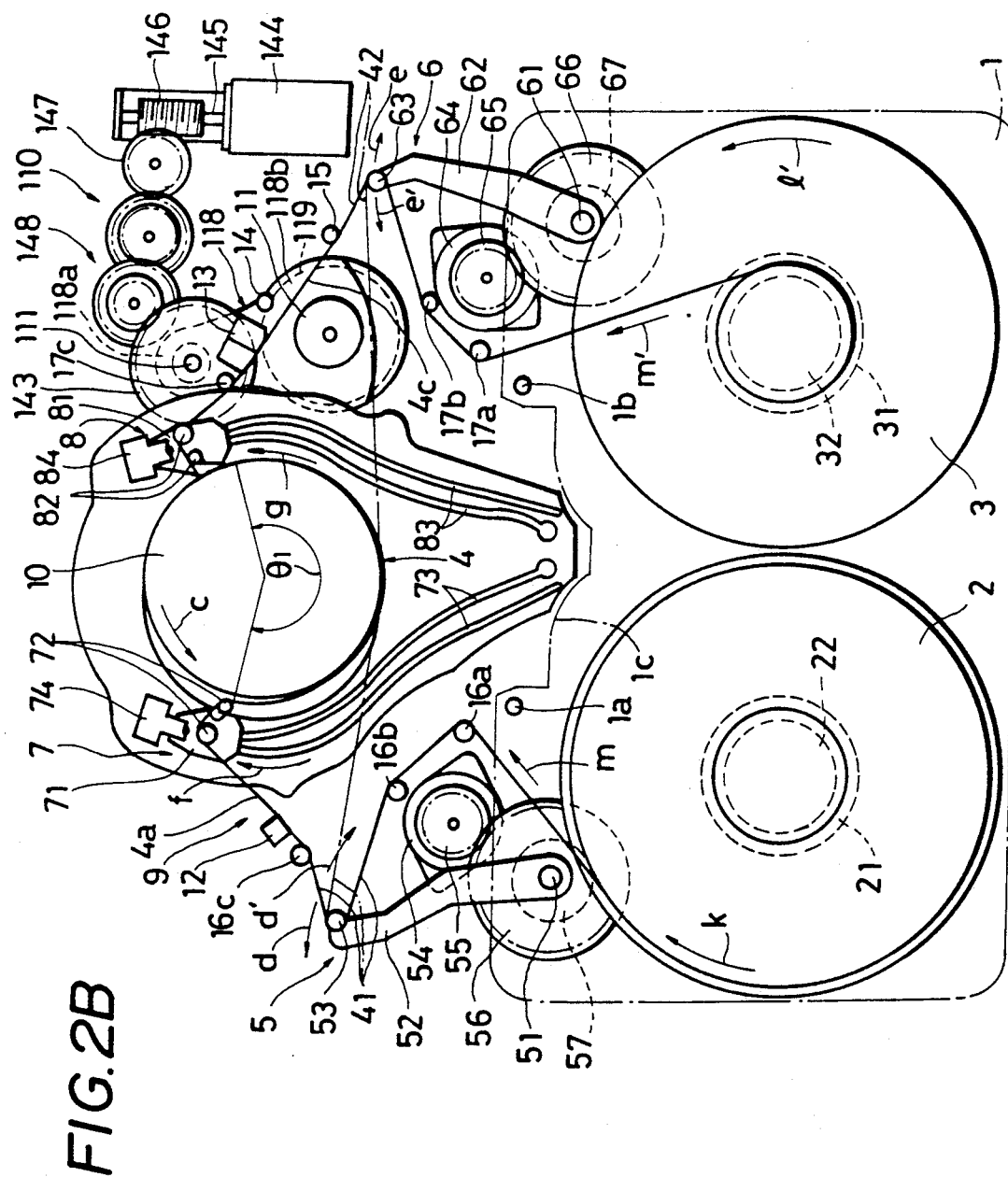

When the rotary head drum 10 is driven at high speed in the direction of arrow c in FIG. 2A by a motor not shown, and both the shafts 51 and 61 are driven by the control motors 54 and 64 after the tape cassette 1 is mounted, the arms 52 and 62 are horizontally rotated in the directions of arrows d and e from back positions indicated in solid lines to forward positions indicated in chain-dotted lines in FIG. 2A (in solid lines in FIG. 2B). A portion of the tape 4 indicated in solid lines in FIG. 2A is horizontally drawn from the tape cassette 1 toward the right and left sides of the tape cassette 1 by the pins 53 and 63 of the arms 52 and 62, respectively, and is located in the position indicated in chain-dotted lines in FIGS. 2A. The arms 52 and 62 located in the forward positions thereafter function as arms for detecting the tape tension.

Successively, the sliders 71 and 81 are driven by the respective motors (not shown), and moved in the directions of arrows f and g on the guideways 73 and 83 from the back ends shown in FIG. 2A to the forward ends shown in FIG. 2B, so that the tape is moved from a position indicated in chain-dotted lines, to a position indicated in solid lines in FIG. 2B by the pair of tape guides 72 and 82 projecting from the respective sliders 71 and 81.

The front surface 4a of the tape 4 is wrapped, at a predetermined contact angle $\theta_1$, around the rotary head drum 10 which faces the tape path 9, and slants at a predetermined angle with respect to the horizontal reference plane. In the tape supply side 41 and in the tape take-up side 42, the tape 4 is guided by the stationary tape guides 16a, 16b and 16c, the pins 53 and the stationary head 12, and by the stationary tape guides 17a, 17b and 17c, the pin 63, the stationary head 13 and the tape guides 14 and 15, respectively. Thus, the tape 4 is rightly positioned in the tape path 9, and the tension of the tape 4 is retained substantially at a constant value during the tape loading operation.

To wrap the tape 4 around the rotary head drum 10 as shown in FIG. 2B, the supply reel base 22 and the take-up reel base 32 are driven by the supply-reel drive motor 21 and the take-up reel drive motor 31, respectively, as the tape 4 is moved by the tape guides 72 and 82 which are driven in the directions of arrows f and g. The supply reel 2 and the take-up reel 3 are rotated in the directions of arrows k and l' together with the supply reel base 22 and the take-up reel base 32, respectively, so that the tape 4 is unwound from the reels 2 and 3 and drawn in the direction of arrow m on the tape supply side 41 and in the direction of arrow m' on the tape take-up side 42.

At that time, the arms 52 and 62 are located in the respective forward positions due to predetermined torques given by the control motors 54 and 64, but if the tape tension varies and the forces acting on the distal ends of the arms 52 and 62 through the pins 53 and 63 are changed, the arms 52 and 62 are rotated in the directions of arrows d or d', and e or e', and as a result, the angles of rotation of the arms 52 and 62 are detected by the goniometry sensors 57 and 67, respectively. Thus, the torques of the supply-reel drive motor 21 and the take-up reel drive motor 31 are automatically controlled by signals from the goniometry sensors 57 and 67, and the back tension of the tape 4 on the tape supply side 41 and on the tape take-up side 42 are adjusted while the tape 4 is unwound from the reels 2 and 3, so that the tape 4 can always be stretched under the best condition.

Thus, the tape 4 is prevented from being damaged due to excessive tension thereof, or from being detached from the tape guides 72 and 82 due to excessive slack thereof during the tape loading operation by the help of the tape guides 72 and 82. Further, though the tape 4 is horizontally drawn from the tape cassette 1 and helically wrapped around the slanted rotary head drum 10, the tape 4 is never damaged because the tape 4 is always stretched under the best condition, and the tape 4 can load at high speed because the tape guides 72 and 82 are movable at high speed in the directions of arrows f and g.

The above-described back-tension control mechanism may be provided only on the tape supply side 41, and after the sliders 71 and 81 are positioned in the forward ends by the positioning means 74 and 84, the tape guides 72 and 82 function as stationary guides for the rotary head drum 10 on the tape supply side 41 and on the tape take-up side 42.

Figure 2C:
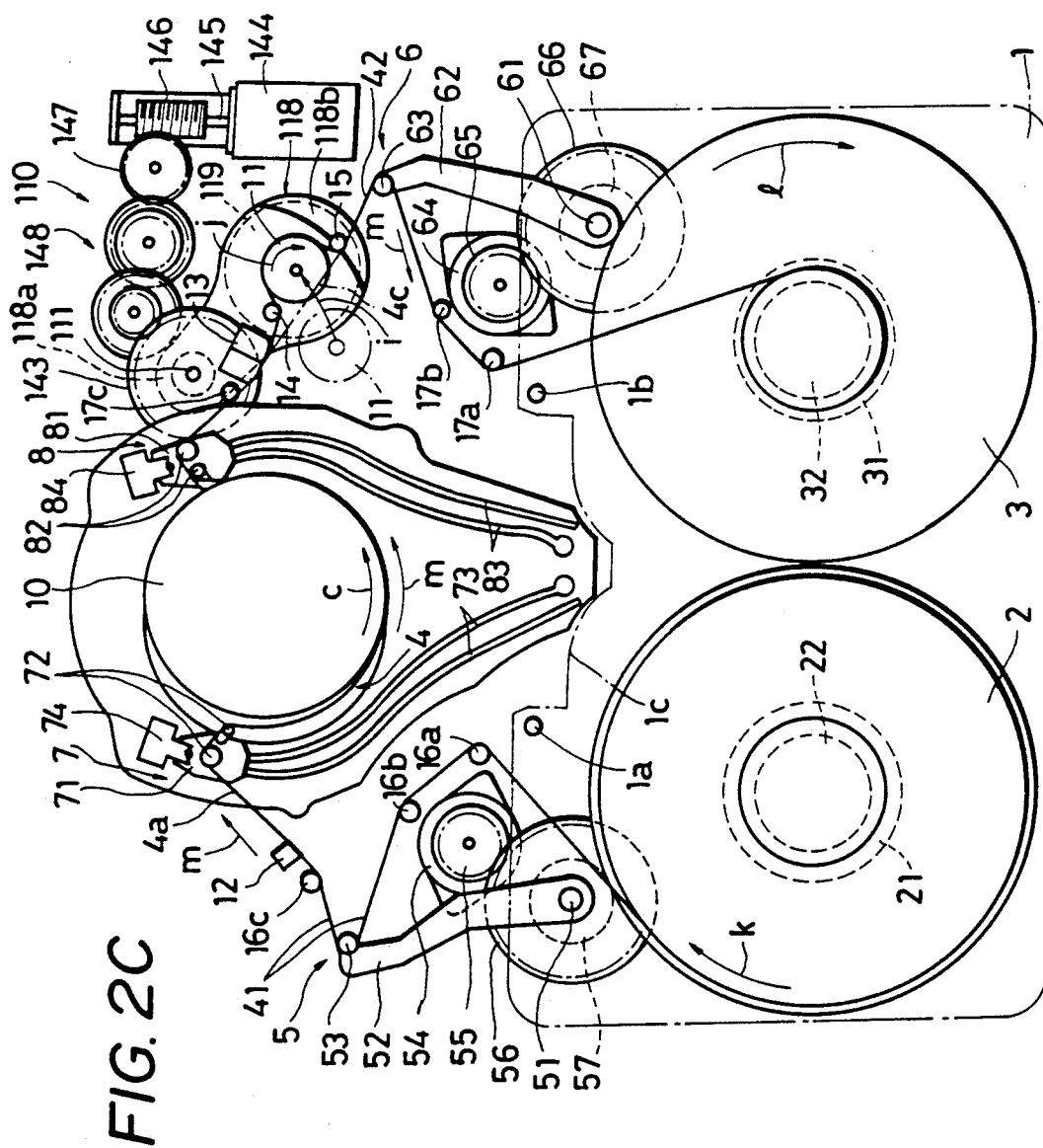

As the tape 4 is loaded and the sensor detects the fact that the arm 62 and the slider 81 arrive in the forward position and at the forward end, respectively, the big capstan 11, which is located in a position indicated in chain-dotted lines in FIG. 2C, is vertically moved to the same height as the tape 4 along the axis of the cylindrical cam 111 of the capstan transport mechanism 110 on the basis of a signal from an AND circuit which is connected to the sensor. Successively, the capstan 11 is horizontally revolved in the direction of arrow i around the cylindrical cam 111 from the position indicated in chain-dotted lines to a position indicated in solid lines in FIG. 2C, so that the back surface 4C of the tape 4 is wrapped around the capstan 11 at a predetermined contact angle.

At that time, as the direction of arrow i coincides with the direction for spreading out the tape 4 with the pin 63 and the tape guide 82, the capstan 11 is naturally inserted into a gap formed between the pair of tape guides 14 and 15, so that the tape 4 is prevented from being damaged due to excessive tension.

Thereafter, when the record mode or the playback mode is established, the capstan 11 is rotated in the direction of arrow j in FIG. 2C by a capstan motor (hereinafter described), and the tape 4 is run at constant speed in the direction of arrow m along the tape path 9 by friction caused between the capstan 11 and the back surface 4C of the tape 4. Simultaneously, the reels 2 and 3 are driven by the respective motors 21 and 31 in the directions of arrows k and l, and the tape 4 is wound on the take-up reel 3. Thus, information is recorded on or reproduced from the tape 4 by the head of the rotary head drum 10 which has already been rotated at high speed in the direction of arrow c. It is to be noted that as the capstan 11 is brought into contact with the back surface 4C of the tape 4, the front surface 4a coated with magnetic powder is prevented from being damaged.

Figure 2D:
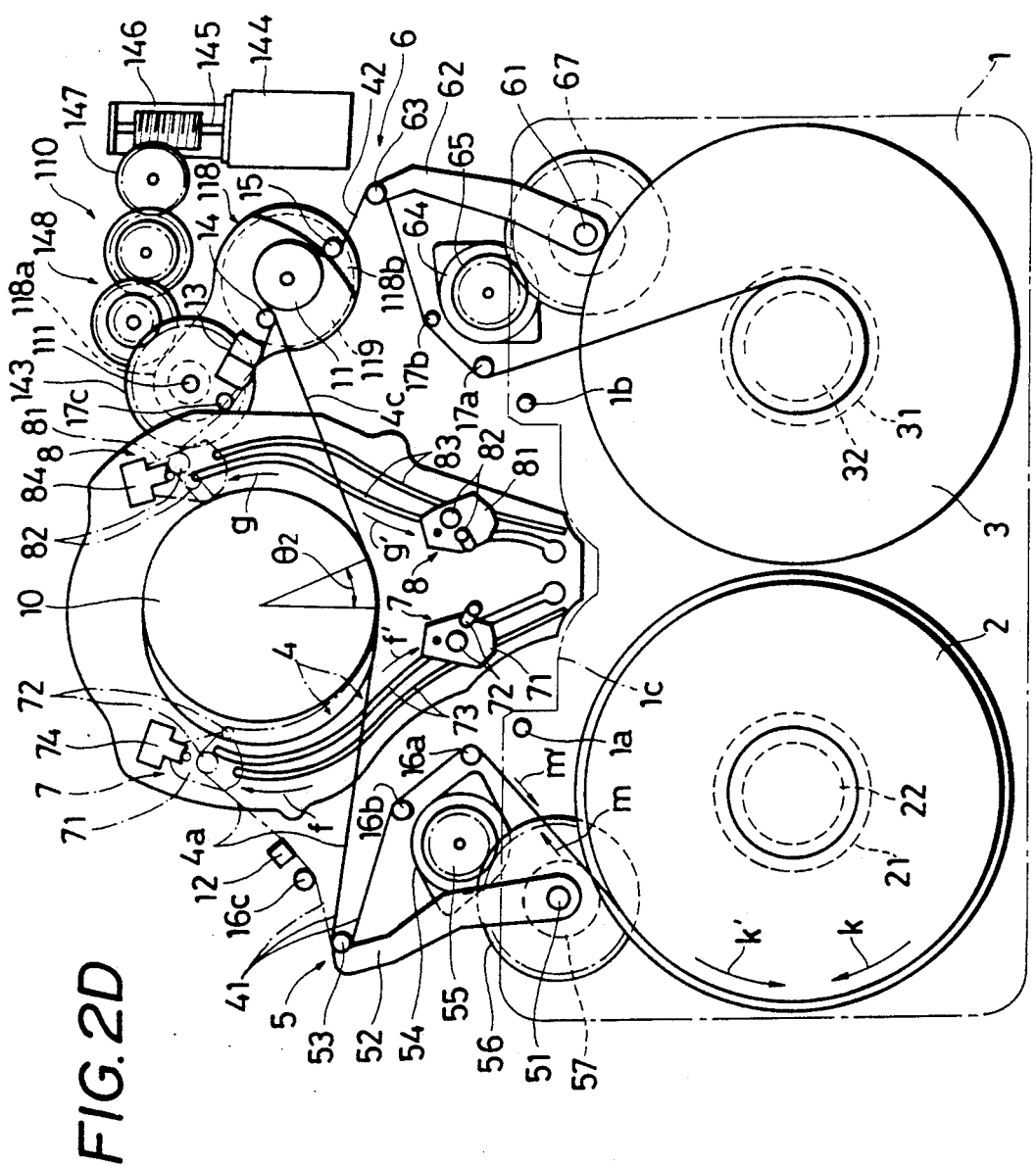
Figure 2E:
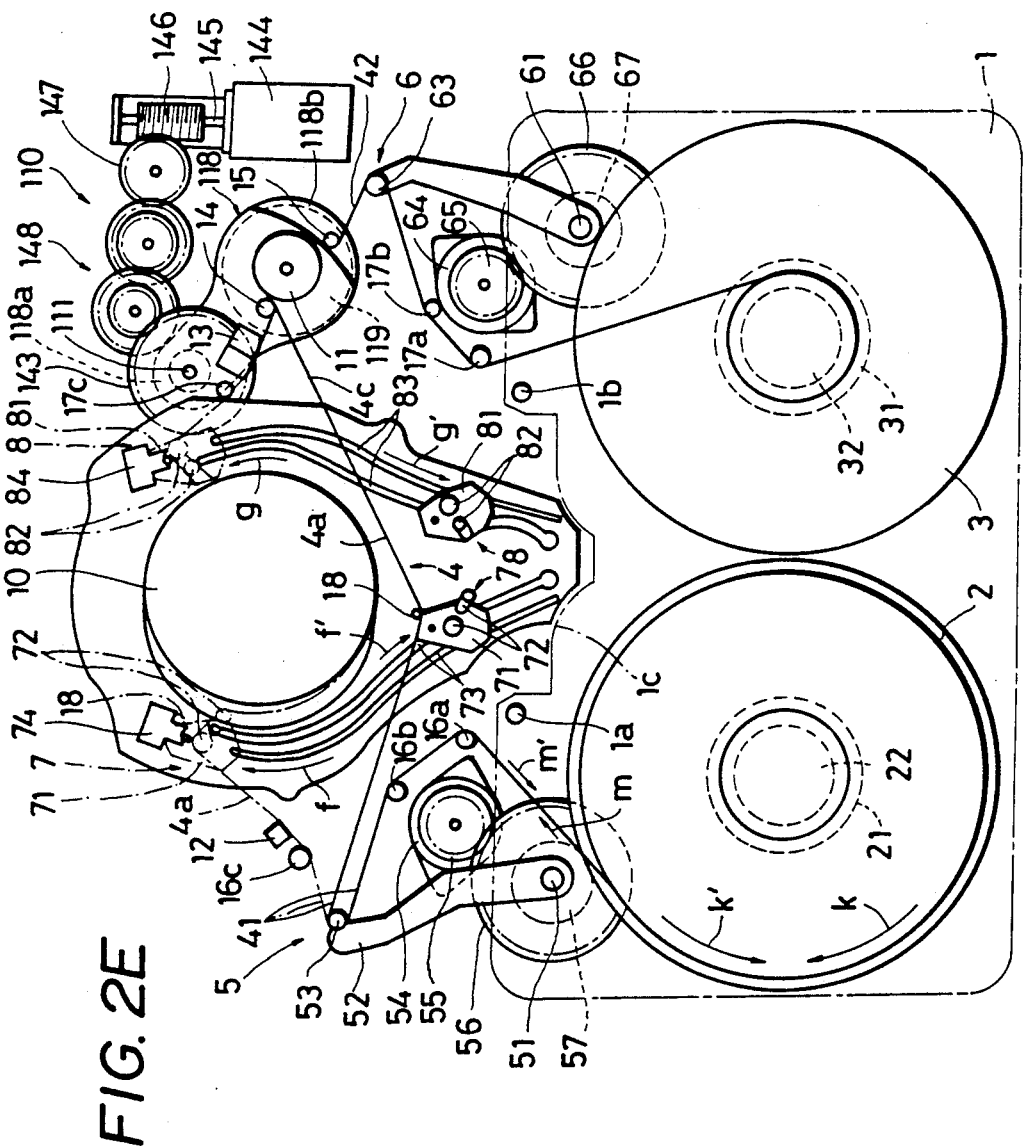

When the record mode or the playback mode is changed over to the pause mode, the capstan 11 and the arms 52 and 62 are retained in the tape drive position and in the forward position, respectively, but as shown in FIG. 2D, both the tape guides 72 and 82 are moved in the directions of arrows f' and g' to predetermined positions (for example, positions indicated in solid lines in FIG. 2D), and the tape 4, which runs in the direction of arrow m', is wound on the supply reel 2 which is rotated in the direction of arrow k' by the supply-reel drive motor 21. The contact angle $\theta_2$ of the rotary head drum 10 with the tape 4 decreases as shown in FIG. 2D when the tape unloading operation is completed. It is noted that as shown in FIG. 2E, the tape 4 may be completely separated from the rotary head drum 10 by a tape guide 18 which is provided on either or both of the sliders 71 and 81. If the contact angle of the rotary head drum 10 becomes zero (noncontact state), it will be unnecessary to reduce the tension of the tape 4 to protect the rotary head and the coated front surface 4a.

When the pause mode is changed over to the record mode or the playback mode, both the tape guides 72 and 82 are moved, in the directions of arrows f and g, to the forward ends indicated in chain-dotted lines in FIGS. 2D and 2E by the sliders 71 and 81, respectively, and the tape 4 is again located in the tape path 9. At that time, the tape 4 is supplied only from the supply reel 2 in the direction of arrow m, the supply reel 2 being rotated in the direction of arrow k by the supply-reel drive motor 21.

Thus, if the record mode or the playback mode is changed over to the pause mode and vice versa, a portion of the tape 4 separated from a part of the rotary head drum 4 is again brought into contact with the same part of the rotary head drum 10, so that it is possible to edit the tape without discreteness. The unloading operation of the tape 4 is the reversal of the above loading operation.

Capstan Transport Mechanism 110 (FIGS. 3 to 7)

Figure 7:
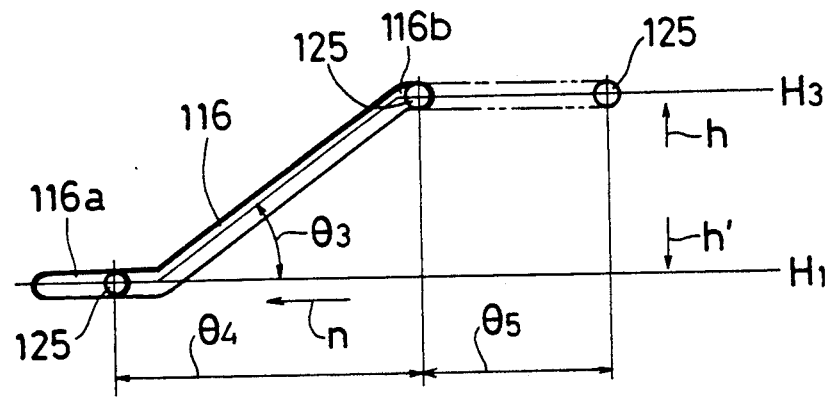
FIG. 7 is a developed model view of a cam groove formed in a cylindrical cam which is incorporated in the capstan transport mechanism of FIG. 3.

The bearing block 112 (FIG. 4A) for supporting bearings 115 of the cylindrical cam 111 is of arcuate shape in section and secured to a chassis 113 with screws 114 through an upper flange 112a thereof so as to be vertically suspended from the chassis 113. The cylindrical cam 111 is vertically arranged so as to be surrounded by the bearing block 112, and supported by the pair of ball bearings 115 which are secured to the upper flange 112a and the lower flange 112b of the bearing block 112, respectively. Formed on the outer periphery of the cylindrical cam 111 is a helical cam groove 116, the lower end of which is horizontally extended, but the upper end of which is not necessarily required to be horizontally extended as shown in FIG. 7.

Figure 3:
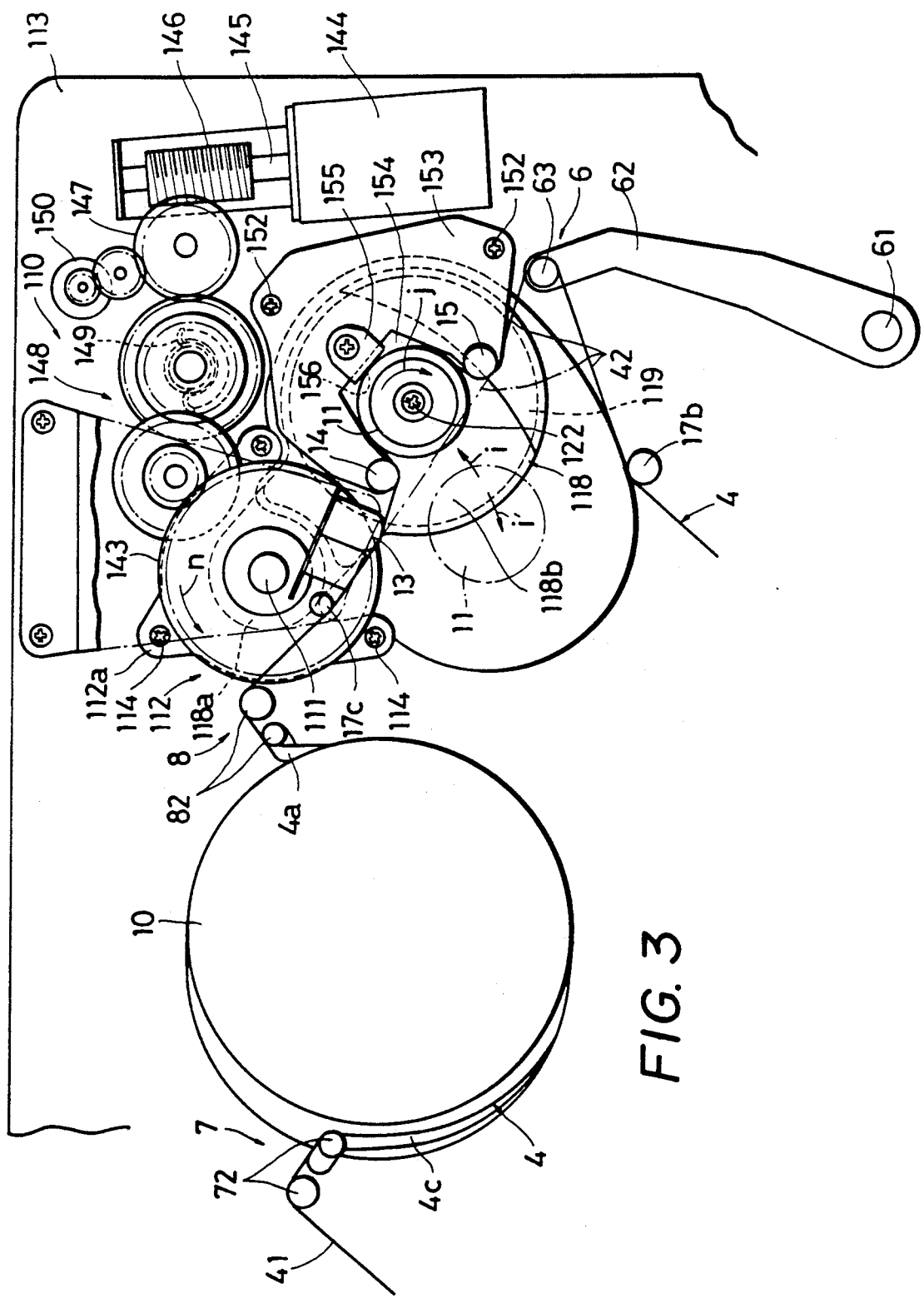
FIG. 3 is a plan view of a capstan transport mechanism incorporated in the tape loading device of FIGS. 1A to 1C.

As shown in FIG. 3, a motor carriage 118 for displacing a capstan drive motor 119 has a cylindrical portion 118a and a horizontally extending portion 118b. The motor 119 is vertically secured to the horizontally extending portion 118b with screws 120 (FIG. 4A) so as to be suspended from the motor carriage 118. The cylindrical portion 118a of the motor carriage 118 is arranged coaxially with the cylindrical cam 111 inside the bearing block 112, and a sleeve 123 is tightly fitted therein. The cylindrical cam 111 is loosely fitted in the sleeve 123.

The horizontally extending portion 118b of the motor carriage 118 extends outside the bearing block 112 through a side opening 112c of the bearing block 112. A motor shaft 121 of the motor 119 extends upwards through the horizontally extending portion 118b, and the big capstan 11 is secured, with a screw 122, to the free end of the motor shaft 121. Thus, the capstan 11 can move upwards and downwards in the direction of arrows h and h' along the cylindrical cam 111, and also can revolve in the direction of arrows i and i' around the cylindrical cam 111.

Figure 4A:
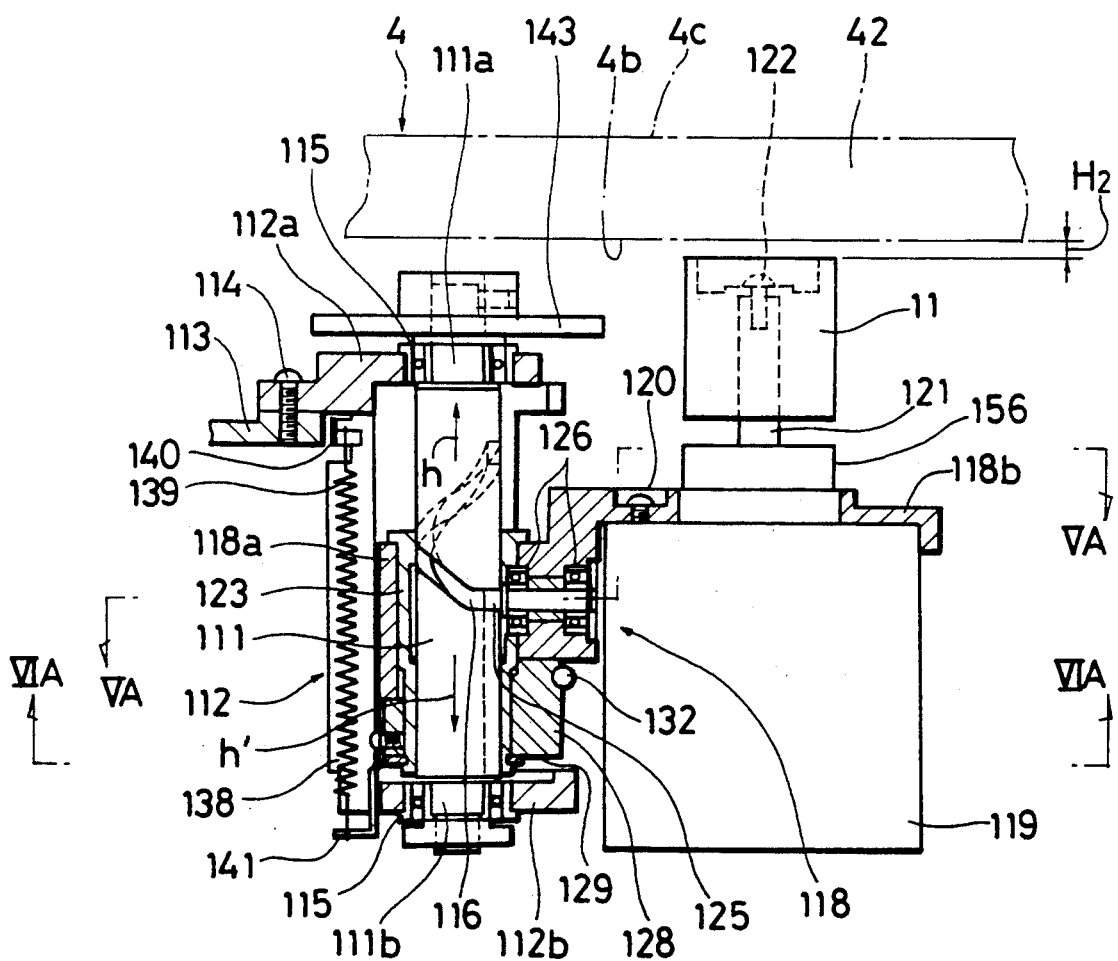
FIGS. 4A and 4B are side views with portions removed for purpose of illustration of the capstan transport mechanism of FIG. 3.

As shown in FIG. 4A, a cam follower 125 is fitted in the cam groove 116 of the cylindrical cam 111, and horizontally and rotatably supported by the motor carriage 118 through a pair of ball bearings 126, but according to load conditions, the cam follower 125 may be supported by a plain bearing or fixed to the motor carriage 118.

Figure 6A:
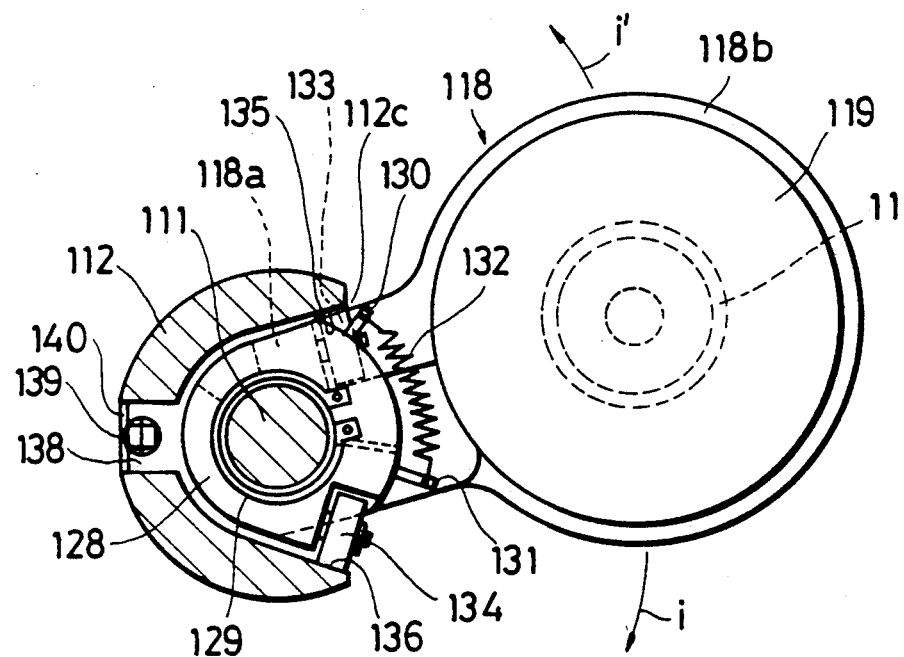
FIGS. 6A and 6B are cross sectional views taken along the line VIA—VIA on FIG. 4A and the line VIB—VIB on FIG. 4B, respectively.
Figure 6B:
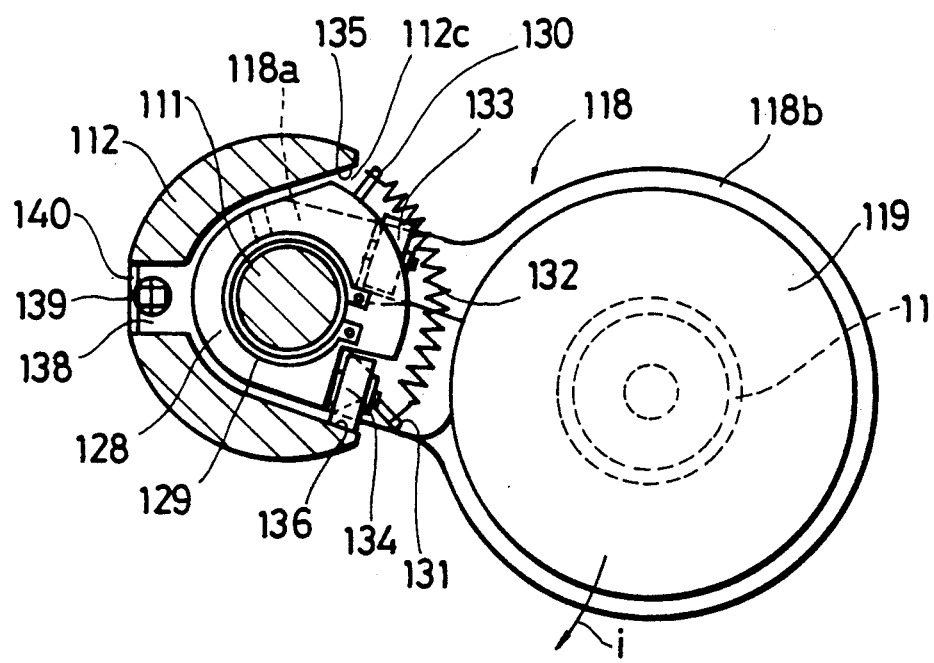

As shown in FIG. 4A, a collar 128, which is substantially of cylindrical shape, is rotatably mounted on the lower end of the sleeve 123 inside the bearing block 112, and sandwiched between the cylindrical portion 118a of the motor carriage 118 and a snap ring 129 which is secured to the sleeve 123. As shown in FIG. 6A, spring anchors 130 and 131 are arranged to project from the collar 128 and the cylindrical portion 118a of the motor carriage 118, respectively, and between the spring anchors 130 and 131, a tension coiled spring 132 is stretched, so that a roller 133 projecting from the cylindrical portion 118a and a roller 134 projecting from the collar 128 are pressed against respective guide surfaces 135 and 136 which are provided on each vertical edge of the side opening 112C of the bearing block 112.

In a position just opposed to the position where the side opening 112c is located, there is provided a vertically extending groove 138 (FIG. 4A) in the bearing block 112. Spring anchors 140 and 141 are arranged to project from the upper end of the bearing block 112 and the collar 128, and a tension spring 139 is stretched between the spring anchors 140 and 141 within the groove 138.

Supported by the bearing block 112 through the tension spring 139 is a movable assembly which comprises the motor carriage 118, the capstan drive motor 119, the big capstan 11, the collar 128 and so forth, and the spring constant of the spring 139 is determined for the lower spring anchor 141 to be retained in the middle of the movable range of the spring anchor 141. Thus, the torque for rotating the cylindrical cam 111 to displace the cam follower 125 can be reduced, and lead angle $\theta_3$ shown in FIG. 7 can be rather freely selectable.

A driven gear 143 is secured to the upper end 111a of the cylindrical cam 111 (FIG. 4A), and as shown in FIG. 3, a drive motor 144 is mounted on the chassis 113. The driven gear 143 is rotated by the drive motor 144 through a gear train 148, and the gear train 148 includes a worm 146 which is secured to the motor shaft 145 of the drive motor 144, a worm wheel 147 which is meshed with the worm 146, a torque limiting spring 149 which has a spring constant higher than that of the spring 132 and can be inserted in an optional position within the gear train 148, and a potentiometer 150 which is inserted in a position between the torque limiting spring 149 and the motor shaft 145.

As shown in FIG. 3, a mounting plate 153 is secured to the chassis 113 with screws 152, and the pair of tape guides 14 and 15 project from the mounting plate 153. Further, a recess 154 is disposed in the mounting plate 153 between the tape guides 14 and 15, and a capstan stop 155 is provided to face the recess 154. The capstan stop 155 can abut against a reference disk 156 which is located under the capstan 11, and formed coaxially with the motor shaft 121 of the capstan drive motor 119.

Before the tape 4 is loaded on the tape path 9, the big capstan 11 is located in the stand-by position indicated in chain-dotted lines in FIG. 3, which is spaced away from the pair of tape guides 14 and 15 in the direction of arrow i and which is low toward the axis of the cylindrical cam 111. At that time, the cam follower 125 is positioned in the horizontal lower end 116a of the cam groove 116 of the cylindrical cam 111 as shown in FIG. 7. That is, the capstan 11 is vertically lowered together with the motor carriage 118 in the direction of arrow h' along the cylindrical cam 111, and located in a position lower by height $H_2$ (FIG. 4A) than the lower edge 4b of the tape 4 which lies on the tape take-up side 42.

Figure 5A:
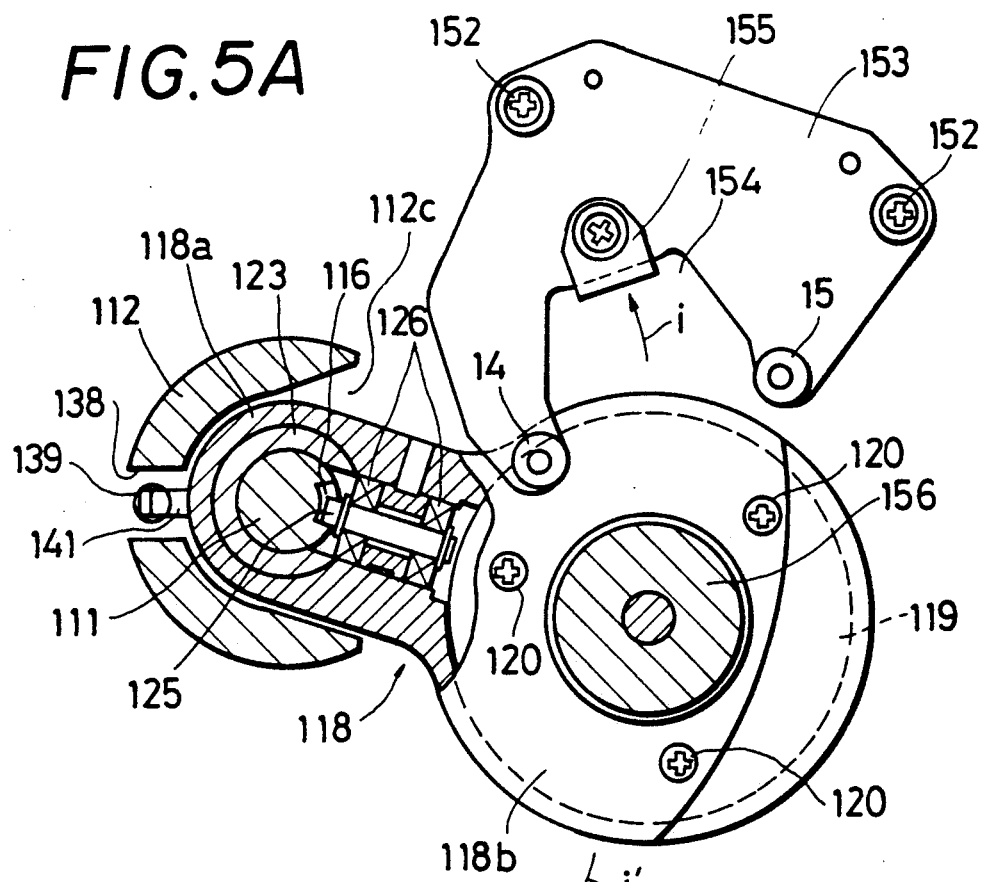
FIGS. 5A and 5B are cross sectional views taken along the line VA—VA on FIG. 4A and the line VB—VB on FIG. 4B, respectively.

While the cam follower 125 is in the horizontal lower end 116a of the cam groove 116, the motor carriage 118 can rotate without any interference by the cylindrical cam 111, so that as shown in FIGS. 5A and 6A, the motor carriage 118 is rotated with respect to the collar 128 in the direction of arrow i' due to force of the spring 132, and the capstan 11 is biased in the direction of arrow i', toward a position spaced away from the pair of tape guides 14 and 15. The tape 4 can horizontally move above the capstan 11 as shown in FIG. 4A without interfering with the capstan 11 when the tape 4 is loaded on the tape path 9 (FIG. 3).

Thereafter, the drive motor 144 is driven in response to a control signal, and the torque of the motor 144 is imparted to the cylindrical cam 111 through the gear train 148 and the driven gear 143 as shown in FIG. 3. The cylindrical cam 111 is, thereby, rotated in a direction of arrow n. It is noted that the torque is imparted through the torque limiting spring 149, and the angle of rotation of the cylindrical cam 111 is detected by the potentiometer 150.

As shown in FIG. 7, the cam follower 125 is vertically raised in the direction of arrow h from height $H_1$, to height $H_3$ due to lead angle $\theta_3$ of the cam groove 116 at a time when the cylindrical cam 111 is rotated through a first angle $\theta_4$ in the direction of arrow n, and then, abuts against the upper end 116b of the cam groove 116.

Figure 4B:
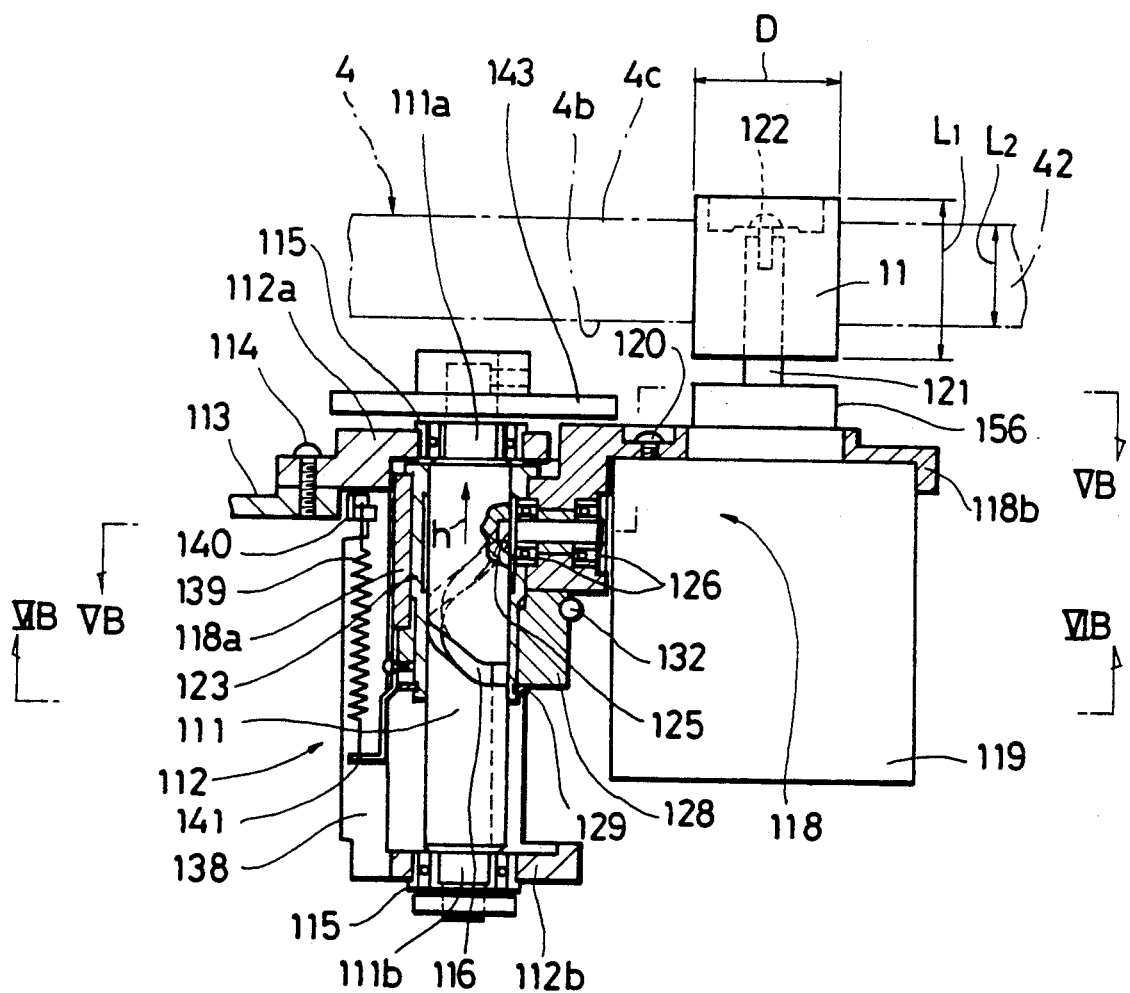

Thus, the big capstan 11 which is integral with the motor carriage 118, is vertically raised in the direction of arrow h as shown in FIG. 4B along the axis of the cylindrical cam 111 to a position of the same height as the tape 4 which lies on the take-up side 42. It is to be noted that whenever the motor carriage 118 is vertically raised together with the collar 128, the carrier 118 and the collar 128 are guided, as shown in FIG. 6A, by the respective guide surfaces 135 and 136 through the rollers 133 and 134. The rollers project from the carriage 118 and the collar 128 and are pressed against the respective guide surfaces 135 and 136 due to force of the spring 132.

As shown in FIG. 7, as soon as the cam follower 125 abuts against the upper end 116b of the cam groove 116, the torque of the cylindrical cam 111, which has a sense of arrow n (FIG. 3), is imparted to the motor carriage 118 through the cam follower 125, so that the motor carriage 118 is horizontally rotated together with the cylindrical cam 111 through a second angle (angle of rotation of the cylindrical cam 111) $\theta_5$ in the direction of arrow n (FIG. 3). That is, the motor carriage 118 is rotated in the direction of arrow i from a position illustrated in FIG. 6A to a position illustrated in FIG. 6B against the force of the tension spring 132. During the rotation of the motor carriage 118, the collar 128 is pushed against the fixed bearing block 112, so that it can not move in the direction of arrow i.

Thus, the capstan 11 is horizontally revolved around the axis of the cylindrical cam 111 from the position indicated in chain-dotted lines to the position indicated in solid lines in FIG. 3, and the back surface 4C of the tape 4 which lies on the tape take-up side 42 is wrapped around the capstan 11 at a predetermined contact angle.

Figure 5B:
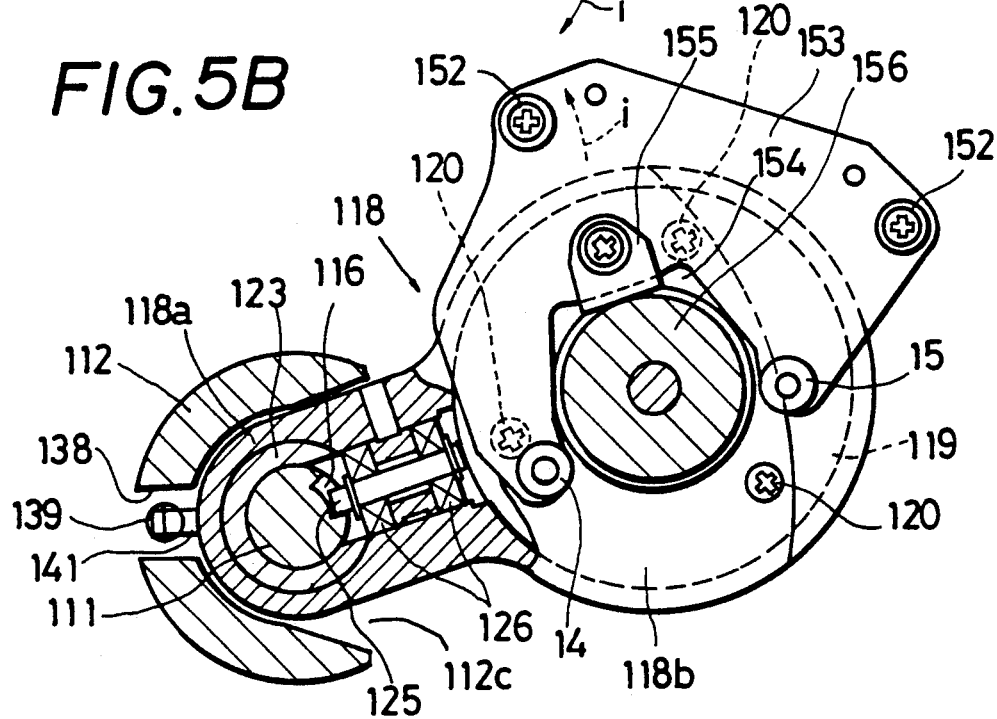

At that time, as shown in FIG. 5B, the reference disk 156 of the capstan drive motor 119, which is rotated in the direction of arrow i together with the motor carriage, is inserted into the recess 154 of the mounting plate 153, and brought into contact with the capstan stop 155 so as to have the capstan 111 rightly located in the tape drive position. The drive motor 144 is successively driven, and energy is stored in the torque limiting spring 145. When the energy reaches a predetermined value, the drive motor 144 is stopped in response to a signal from the potentiometer 150, and locked due to the locking function of the worm 146 and worm wheel 147.

As soon as the record mode or the playback mode is, thereafter, established, the big capstan 11 is rotated at high speed in the direction of arrow j by the capstan drive motor 119 as shown in FIG. 3, so that the tape 4 is run at constant speed in the direction of arrow m due to friction caused between the big capstan 11 and the back surface 4C of the tape 4. It is noted that the big capstan 11 is returned from the tape drive position to the original position due to reverse rotation of the motor 144.

According to the above capstan transport mechanism 110, it is possible to insert the big capstan 11 easily into a space which is outside the tape cassette 1 and is surrounded by the tape cassette 1 and the portion of the tape 4, which has been loaded on the tape path 9, so that the diameter D and the length $L_1$ (FIG. 4B) of the big capstan 11 can be determined independently of the area and the height of the opening 1c (FIG. 2A) of the tape cassette 1. Thus, it is possible to make the diameter D sufficiently large so as to make the tape 4 run at high speed to shorten access time, and it is possible to make the length $L_1$ sufficiently larger than the width $L_2$ of the tape 4 so as to enable the tape 4 to be stably run.

Moreover, the motor carriage 118 is moved upwards and downwards in the direction of arrows h and h', and horizontally rotated in the direction of arrows i and i' only by the help of the single cylindrical cam 111, so that the parts of and the steps required for the assembly of the capstan transport mechanism 110 can be reduced. Thus, it is possible to make the construction of the mechanism 110 very simple and very compact. In addition, an adjustment required for securing the capstan 11 at a right angle to the chassis 113 in the assembling process becomes very simple, because it is accomplished if the bearing block 112 of the cylindrical cam 111 is vertically secured to the chassis 113.

Figure 8:
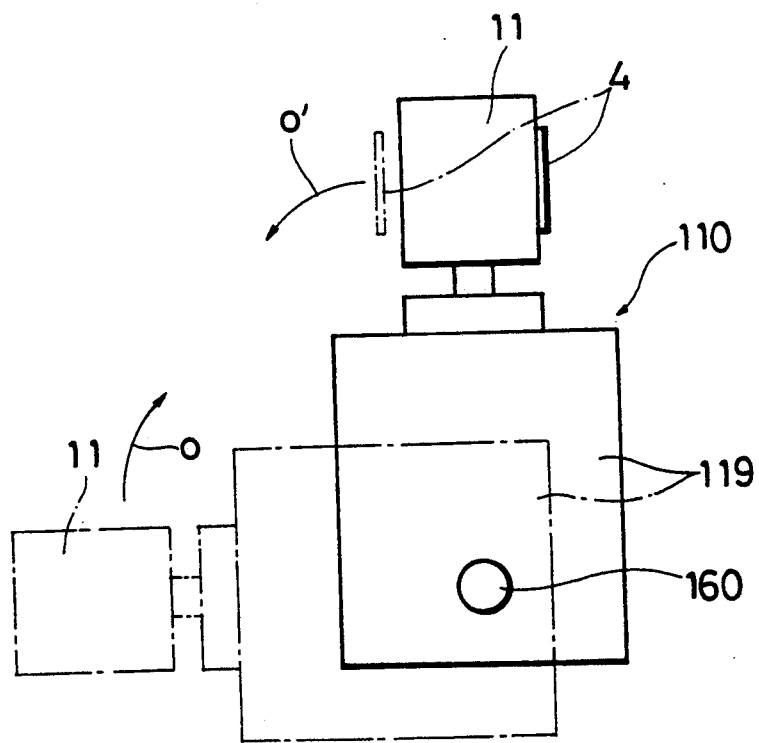
FIG. 8 is a schematic side view of another capstan transport mechanism.

In the meantime, the capstan transport mechanism 110 may be formed as illustrated in FIG. 8. In FIG. 8, the capstan drive motor 119 is supported by a shaft 160 so as to be rotatable in a direction of arrows o and o', so that the capstan 11 is revolved on the shaft 160 from a position indicated in chain-dotted lines to a position indicated in solid lines. Therefore, as soon as the capstan is moved in the position indicated in solid lines, the tape which is located in a position indicated in chain-dotted lines in FIG. 8 is stretched by and wrapped around the capstan 11 as indicated in solid lines in FIG. 8.

Figure 9:
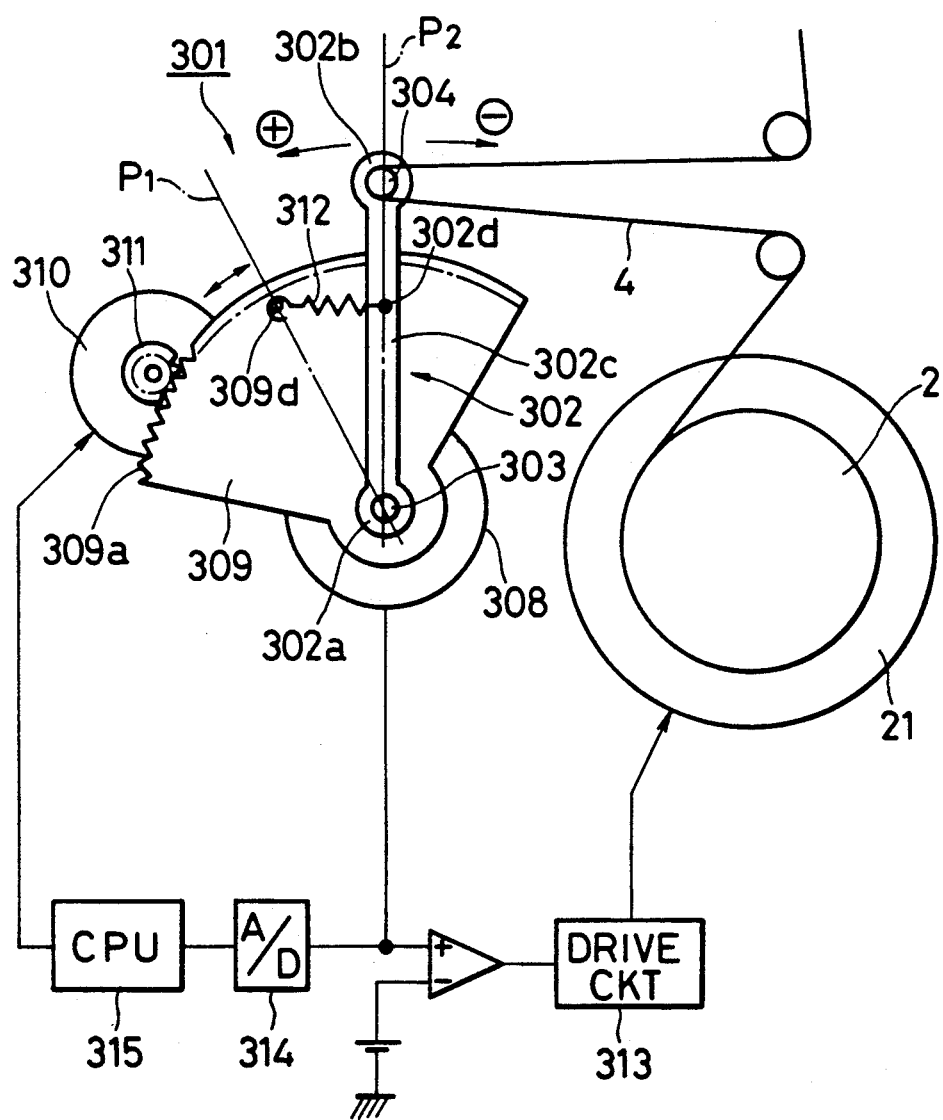
FIG. 9 is a schematic plan view of a tape-tension adjusting device incorporated in the tape loading device of FIGS. 1A to 1C.

Tape-tension Adjusting Device 301 (FIGS. 9 and 10)

As shown in FIG. 9, a tape-tension adjusting device 301 comprises an arm 302 which is rotatably supported, at the proximal end 302a thereof, by a shaft 303 which projects from the chassis (not shown), and which has a tape guide 304 at the distal end thereof to detect the tension of the magnetic tape 4 which is wrapped around the tape guide 304; a sensor 308 for detecting the angle of rotation of the arm 302, which is arranged under the proximal end 302 a of the arm 302; a sector wheel 309 the teeth 309a of which is meshed with a pinion 311 of a stepping motor 310, and which is rotatable in normal and reverse directions on the shaft 303; and a tension spring 312 which is stretched between a spring stop 302d provided in the arm 302 and a spring stop 309d provided in the sector wheel 309, and the force of which is changed due to rotation of the sector wheel 309 so as to bring the arm 302 to a reference position in a transition range of the tape tension.

According to the servo circuit of the tape-tension adjusting device 301, the angle of rotation of the arm 302 is detected by the sensor 308, and a potential difference, which generates between a signal voltage from the sensor 308 and a reference voltage, is applied to a drive circuit 313 to control the torque of the reel drive motor 21. At the same time, the signal from the sensor 308 is applied to a central processing unit (CPU) 315 through a analog-to-digital converter 314 to control the angle of rotation of a stepping motor 310, and as a result, the angle of rotation of the sector wheel 309, which is rotated by the stepping motor 310 through a pinion 311, is controlled to revolve the spring stop 309d of the tension spring 312 on the shaft 303, and change the force of the tension spring 312 to a pertinent value.

An example of operation of the tape-tension adjusting device 301, for example, at the time of the stop mode being changed over to the playback mode, will be hereinafter described.

Figure 10A:
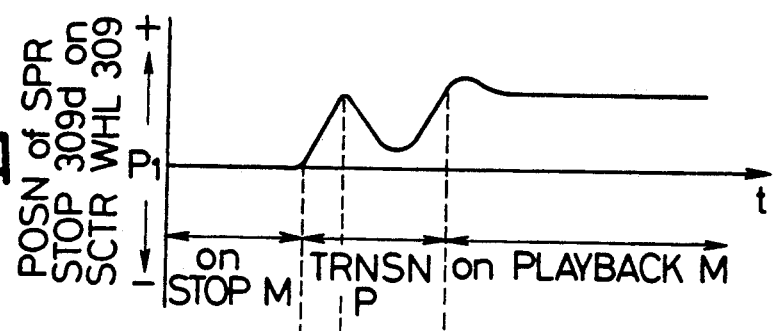
FIGS. 10A to 10C are diagrams which show relationships between time and positions of a spring stop provided on a sector wheel, positions of an arm, and tape tension, respectively.
Figure 10B:
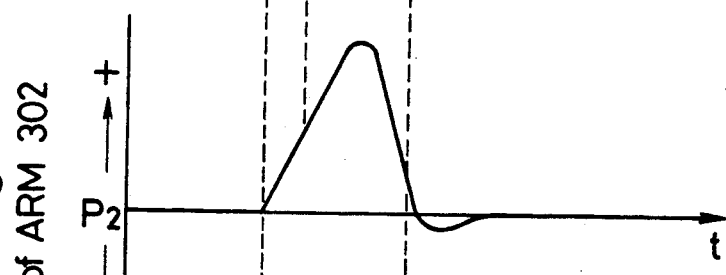
Figure 10C:
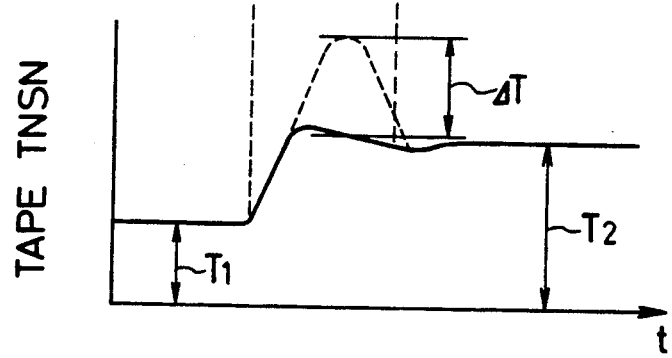
Figure 11:
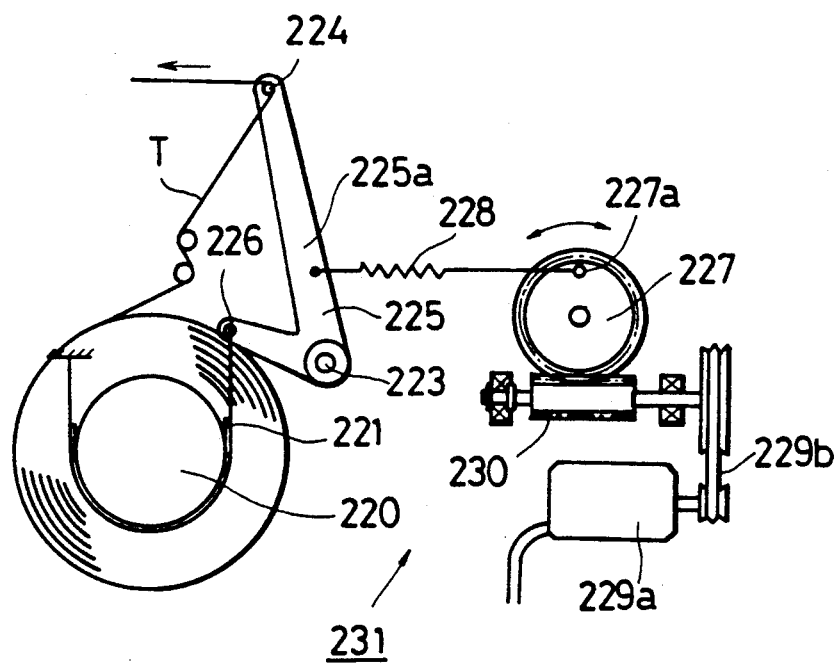
FIG. 11 is a schematic plan view of a conventional tape-tension adjusting device.
Figure 12:
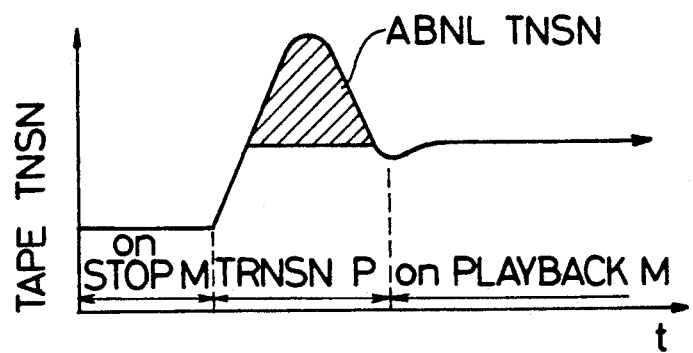
FIG. 12 is a diagram which shows relationships between time and tape tension in the conventional tape-tension adjusting device of FIG. 11.

In the stop mode, in which the device is still connected to the source, the spring stop 309d and the arm 302 are located in respective reference positions $P_1$ and $P_2$ as shown in FIGS. 9, 10A and 10B, and at that time, the magnetic tape 4 is stretched by tension $T_1$ as shown in FIG. 10C. As soon as the stop mode is changed over to the playback mode, the spring stop 309d of the sector wheel 309 is revolved in a positive direction (denoted by $\oplus$ in FIG. 9), so that the arm 302 is also rotated in the positive direction as shown in FIG. 10B due to increased force of the tension spring 312. As a result, the back tension of the magnetic tape 4 is increased due to change of the torque of the supply-reel drive motor 21, and thereby, the arm 302 is rotated in a negative direction (denoted by $\ominus$ in FIG. 9). At the same time, the spring stop 309d is controlled so as to revolve in the negative direction in FIG. 9, and the force of the tension spring 312 is instantaneously reduced.

Thus, the magnetic tape 4 is prevented from being given an abnormal tension $\Delta T$ (FIG. 10C) during the transition period caused between the stop mode and the playback mode, and after the transition period, the spring stop 309d is revolved in the positive direction to give tension $T_2$ (FIG. 10C) to the tape 4.

Therefore, whenever one mode which gives low tension to the tape 4 is changed over to the other mode which gives high tension to the tape 4, the tape 4 is surely prevented from being abnormally stretched if there is a time lag in the operation of the servo circuit. Thereby, the tape 4 does not suffer damages, and it becomes possible to change over the mode at high speed.

Moreover, in the above tape-tension adjusting device 301, the arm 302, the sensor 308 and the sector wheel 309 are coaxially arranged, so that the device is scarcely influenced by a change of an atmospheric temperature. Thus, it can be performed with high accuracy to detect the angle of rotation of the arm 302, and control located positions of the sector wheel 309. It is to be noted that the sector wheel 309 may be changed to a spur wheel.

Having described an illustrative embodiment of this invention with reference to the accompanying drawings, it is to be understood that the invention is not limited to that precise embodiment, and that various changes and modifications may be effected therein by one skilled in the art without departing from the scope or spirit of the invention as defined in the appended claims. Further, the present invention is applicable not only to the digital VTR but also to the various kind of cassette tape recording and/or reproducing apparatuses.

What is claimed is:

1. A tape loading device for loading a tape from a mounted tape cassette around a rotary head drum, the device comprising:

means for defining a tape path which faces the rotary head drum arranged in front of the mounted tape cassette;

tape loading means whereby a tape is drawn from the mounted tape cassette and wrapped around the rotary head drum at a first predetermined contact angle to load the tape on the tape path;

a capstan assembly having a predetermined large diameter capstan driven by a drive motor mounted on a motor carriage and including a cam follower all of which is arranged in front of the mounted tape cassette; and a capstan assembly transport mechanism for moving the capstan assembly from a stand-by position where the capstan does not interfere with movement of the tape drawn from the mounted tape cassette and loaded on the tape path, to a tape drive position where the capstan is inserted into a space formed between the mounted tape cassette and a portion of the tape which has been loaded on the tape path so as to drive the tape by friction between the tape and the capstan, wherein the capstan assembly transport mechanism includes a driven cylindrical cam with a helically extending cam groove that has the cam follower engaged therewith so that as the cylindrical cam is driven to rotate the motor carriage is driven vertically along the axis of the cylindrical cam and horizontally revolved about the axis of the cylindrical cam.

2. A tape loading device according to claim 1, further comprising a tape-tension control mechanism for keeping a back tension of the tape substantially constant while the tape accommodated in the mounted tape cassette is loaded on the tape path by the tape loading means.

3. A tape loading device according to claim 1, in which when a pause mode is established, the capstan is retained in the tape drive position by the capstan transport mechanism and further comprising means for controlling said tape loading means so that in the pause mode the portion of the tape loaded on the tape path is unwound from the rotary head drum and is stopped at a second predetermined contact angle less than the first predetermined contact angle.

4. A tape loading device according to claim 1, further comprising a pair of tape guides, wherein the capstan transport mechanism inserts the capstan into a gap formed between the pair of tape guides so as to have the tape wrapped around the capstan drum at a large contact angle.

5. A tape loading device for loading a tape from a mounted tape cassette around a rotary head drum, the device comprising:
    means for defining a tape path which faces the rotary head drum arranged in front of the mounted tape cassette;
    tape loading means whereby a tape is drawn from the mounted tape cassette and wrapped around the rotary head drum at a predetermined contact angle to load the tape on the tape path;
    a capstan having a predetermined large diameter which is arranged in front of the mounted tape cassette; and
    a capstan transport mechanism for moving the capstan from a stand-by position where the capstan does not interfere with the movement of the tape drawn from the mounted tape cassette and loaded on the tape path, to a tape drive position where the capstan is inserted into a space formed between the mounted tape cassette and a portion of the tape which has been loaded on the tape path so as to drive the tape by friction between the tape and the capstan,
    wherein the capstan transport mechanism comprises a driven cylindrical cam having a helically extending cam groove, and a motor carriage having a cam follower guided by the helically extending cam groove, and on which a capstan drive motor for driving the capstan is mounted, and as the cylindrical cam is rotated, the motor carriage is vertically moved along the axis of the cylindrical cam, and thereafter, horizontally revolved around the axis of the cylindrical cam.

6. A tape loading device according to claim 5, further comprising a bearing block of an arcuate shape in section for supporting bearing of the cylindrical cam, wherein the motor carriage is suspended from the bearing block through a spring and guided by the bearing block along the cylindrical cam.

7. A tape loading device according to claim 5, further comprising a tape-tension adjusting device including a reel drive motor for regulating a back tension of a tape loaded on the tape path, a rotatable arm for detecting tape tension, a spring for urging the arm against the tape tension, a stepping motor for controlling force of the spring, a sensor for detecting an angle of rotation of the arm, a servo circuit for controlling back tension of the tape based on a signal from the sensor due to rotation of the reel drive motor and thereby controlling the force of the spring due to rotation of the stepping motor, wherein the force of the spring is controlled so as to be instantaneously decreased to prevent the tape tension from abnormally increasing for a transition period between two operation modes.

* * * * *

UNITED STATES PATENT AND TRADEMARK OFFICE
CERTIFICATE OF CORRECTION

PATENT NO. : 5,093,752
DATED : March 3, 1992
INVENTOR(S) : Tsuguo Sato, Hirobumi Nagumo, Takashi Shimodaira, Etsuro Saito It is certified that error appears in the above-identified patent and that said Letters Patent is hereby corrected as shown below:

Col. 16, line 15, change "bearing" to --bearings--

Signed and Sealed this

Seventeenth Day of August, 1993

Attest:

BRUCE LEHMAN

*Attesting Officer*     *Commissioner of Patents and Trademarks*